3,505,300
METHOD OF REFINING RESINS
Ben F. Galloway, Beaumont, Tex., assignor to The Goodyear Tire & Rubber Company, Akron, Ohio, a corporation of Ohio
Filed Dec. 18, 1968, Ser. No. 784,682
Int. Cl. C08d 13/14; C08f 47/24
U.S. Cl. 260—80.7
10 Claims

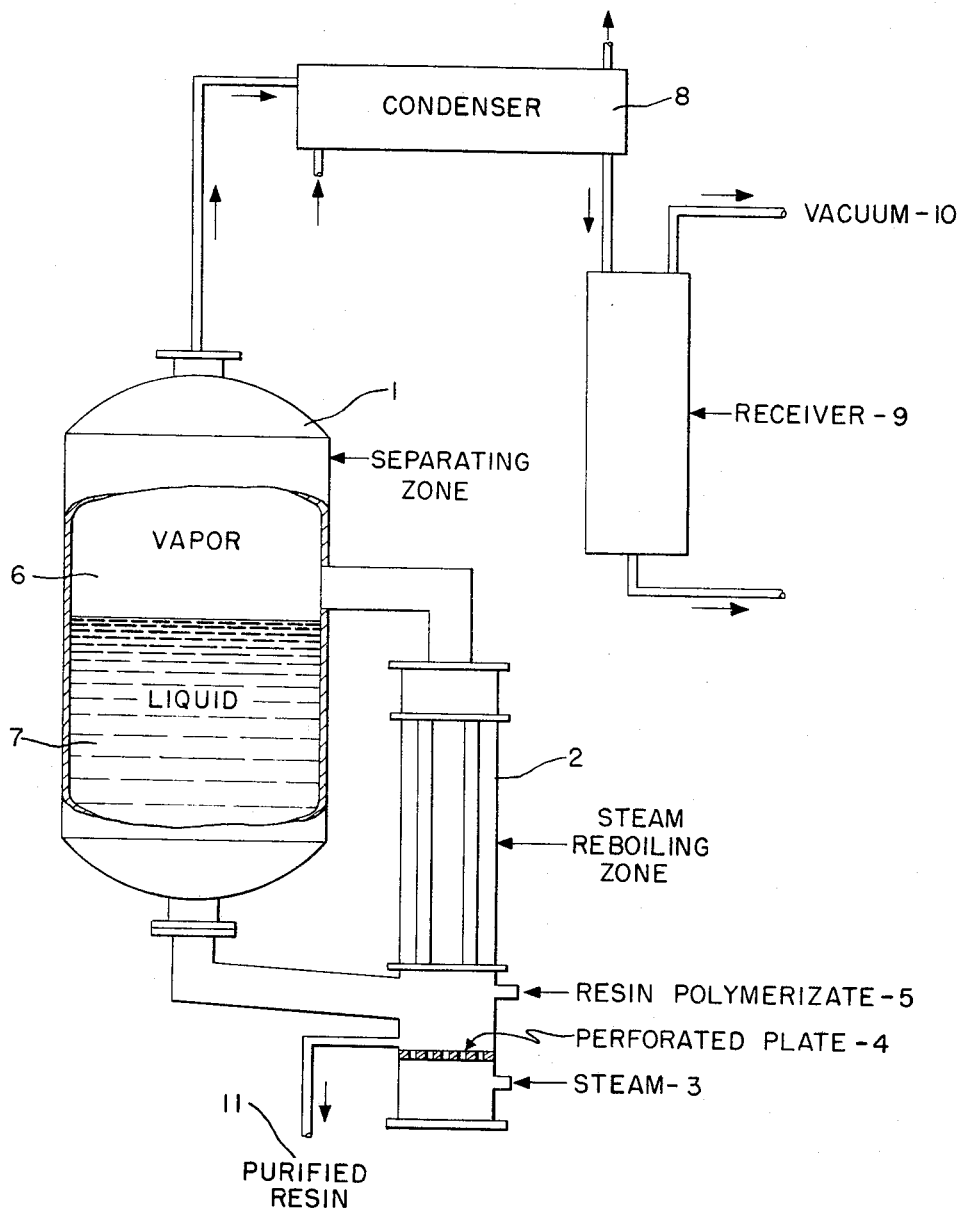

ABSTRACT OF THE DISCLOSURE

A method of refining a resin composition comprising a resin containing lower molecular weight polymers which comprises obtaining the resin composition in a liquid phase in a resin refining system comprising a thermosyphon reboiler driven by steam distillation, where the steam is introduced at a sufficient rate to entrain at least a part of the resin and where at least a part of the lower molecular weight polymer is withdrawn with the steam from the refining system.

---

This invention relates to a method of purifying resins. More particularly, this invention relates to a method of purifying hydrocarbon resin polymerizates and resins, particularly monoolefin-diolefin hydrocarbon-derived polymerizates and resins.

Various resins have softening points that are too low for many commercial applications. The softening points of the various resins are normally raised by removal of lower molecular weight polymers through lengthy steam distillation. Furthermore, many of the resins have objectionable odors, particularly when heated. For example, various hydrocarbon resins prepared by the polymerization of monoolefins and diolefins with Friedel-Crafts type catalysts contain a minor portion of low molecular weight polymers such as oils which lower their softening points and cause objectionable odors. However, even with lengthy steam distillation, the lower molecular weight polymers have often not been sufficiently removed to effectively increase the softening points of various resins to desirable levels for commercial purposes and objectionable odors contained in various hydrocarbon resins have often not been removed therefrom and sometimes have even been intensified.

Therefore, it is an object of this invention to provide a method for refining resin polymerizates and resins. It is a further object to provide a method of improving the softening points of resins, particularly monoolefin-diolefin derived resins.

According to this invention it has been discovered that a method of refining a resin composition containing lower molecular weight polymers comprises obtaining the resin composition in a liquid phase in a resin refining system which comprises a thermosyphon reboiler driven by steam distillation where the steam is introduced at a sufficient rate to entrain at least a part of the resin and where at least a part of the lower molecular weight polymer is withdrawn with the steam from the refining system.

In the practice of this invention it has been found that a method of refining a resin composition comprising a resin containing lower molecular weight polymers, comprises (a) obtaining the composition in a liquid phase in a resin refining system comprising a separating zone and a steam reboiling zone, where the separating zone has an upper vapor portion and a lower liquid portion containing an enriched liquid resin composition, and in the refining system (b) discharging the liquid composition in a liquid enriched resin state from the liquid portion of the said separating zone into the said steam reboiling zone, (c) passing steam to the lower portion of the steam reboiling zone and into the said enriched liquid resin composition therein at a sufficient rate to entrain at least a portion of the liquid resin and low molecular weight polymers in particulate form, (d) recycling at least a part of the lower molecular weight polymers from the upper portion of the steam reboiling zone to the vapor portion of the separating zone, (e) withdrawing the steam and at least a part of the lower molecular weight polymers from the vapor portion of the separating zone to enrich the resin composition, condensing the remainder of the lower molecular weight polymers into the liquid portion of the separating zone, and (f) maintaining a sufficient amount of liquid enriched resin composition in the liquid portion of the separating zone to provide a positive pressure differential between the separating zone and the steam reboiling zone. It is preferred in the practice of this invention, to recycle at least a part of the entrained molten resin from the upper portion of the reboiling zone to the vapor portion of the separating zone and to deposit the entrained resin in the liquid portion of the separating zone. In order to obtain the resin composition in a liquid phase, it is usually desirable to heat the composition above its melting point or to dissolve it in a volatile organic solvent. Because of the violent entrainment and boiling action in the reboiling zone and recycling into the separating zone caused by the rate of steam introduction, mechanical agitation is not normally necessary in the separating zone.

The method of this invention is particularly useful for refining resin compositions which are resin polymerizates containing a mixture of compounds having a wide divergence of melting and boiling points comprising a resin containing lower molecular weight polymers, unreacted monomers and volatile organic solvent prepared by the polymerization of unsaturated hydrocarbons in a volatile organic solvent in the presence of a Friedel-Crafts type catalyst. It is preferable to remove the catalyst and catalyst residues from the polymerizate by methods such as those well known to those skilled in the art, before the refining treatment. In this treatment, steam, at least a part of lower molecular weight polymers, unreacted monomers and volatile organic solvent are removed from the vapor portion of the separating zone to enrich the resin composition in the liquid portion of the refining zone.

The advantages and objects of this invention may be more readily understood by reference to the drawing showing a schematic view of a resin refining system comprising a separating zone 1 and a steam reboiling zone 2. The separating zone has a vapor portion 6 and an enriched liquid resin portion 7.

Reference to the drawing shows a steam reboiling zone 2 where steam 3 is introduced through a perforated plate 4 into the lower portion of the reboiling zone. If desired, the steam can be superheated. Above the perforated plate 4 a liquid resin polymerizate 5 is introduced comprising a resin containing a minor portion of lower molecular weight polymers such as oils, unreacted monomers and a volatile organic solvent. For example, the resin polymerizate can be prepared by polymerizing a monoolefin-diolefin mixture comprising from about 20 to about 75 weight percent of piperylene and from about 80 to about 25 weight percent 2-methyl-2-butene in the presence of an anhydrous catalyst such as aluminum chloride. The polymerization can be carried out at a temperature of from about —20° C. to about 100° C. in a solvent such as heptane. After ordinary steam stripping for about 20 hours the recovered resin normally has a softening point of about 95° C. to about 100° C. and a disagreeable odor upon slight heating. After treatment by the method of this invention, for about 8 hours, the recovered resin normally has a softening point of at least 100° C. and little or essentially no disagreeable odor. In the schematic drawing the steam is injected through the perforated plate at a sufficient rate to vaporize the unreacted monomer and volatile organic solvent, entrain the molten resin and lower molecular weight polymers and drive the monomer, solvent and at least a part of the resin and lower molecular weight polymers through the reboiling zone 2 and into the vapor portion 6 of the separating zone. The rate of steam introduction required to entrain the molten resin can easily be determined by one of ordinary skill in the art. Thus, at least a part of the resin becomes entrained. It is understood that a part of the lower molecular weight polymers may be in the vapor phase. In the separating zone, the molten resin is simply deposited from entrainment into the enriched liquid resin composition portion 7 of the separating zone 1. The steam and at least a part of the monomers, solvent and low molecular weight polymers are withdrawn overhead from the vapor portion 6, condensed in the condenser 8 and collected in the receiver 9. If desired, a vacuum 10 can be applied to the system to promote their more rapid and efficient removal. Generally, only a very small part of the monomers and solvent, if any, are condensed into the liquid portion 7. The enriched liquid resin composition in liquid portion 7 of the separator 1 is recycled to the lower portion of the reboiling zone 2 and retreated until it has reached its desired degree of purification. An indication of the degree of purification is the temperature of the liquid resin composition. The purified resin is then withdrawn 11 from the reboiler and cooled to solidification. Sufficient enriched liquid resin composition is maintained in the liquid portion 7 of the separator 1 to provide a positive pressure differential between the said liquid portion 7 and the reboiling zone 2. Thus, the liquid recycling from the separator to the reboiling zone is preferably facilitated by simple gravity flow. It is evident from the description that the method of this invention can be operated on a batch or a continuous basis. If the method is operated on a batch or a continuous basis. If the method is operated on a batch basis, the solvent is usually quickly vaporized and flash distilled out of the refining system. Then the introduction of steam is used to entrain the resin and cause it to recycle. The steam removes the oils from the resin which causes its softening point to increase.

In refining the resin polymerizates and resins according to the practice of this invention, they can be treated at atmospheric pressure or above or below atmospheric pressure, for various periods of time such as from about one-half hour to about two hours or even to about 12 hours or more, depending somewhat upon the resin composition and degree of refining desired. To facilitate shorter treatment times it is usually preferred to conduct the treatment under a reduced pressure such as from about 10 to about 500 and preferably from about 50 to about 200 millimeters of mercury. Various temperatures can be used for the treatment. It is preferred that a sufficient temperature be used which will liquify the resin but not to appreciably degrade it. Therefore, typically the temperatures may range from about 80° C. to about 200° C. In order to achieve a desired operating temperature and to entrain the resin, the steam may be superheated under pressure prior to its introduction into the resin refining system.

In the practicing of this invention, it is sometimes preferable that the resin composition be treated in the presence of a diluent. In the case of a resin polymerizate the diluent is normally already present as an inert volatile organic solvent used in the polymerization reaction. Various diluents can be used and preferably they are selected as solvents for the particular resin being treated. Representative of the various diluents which can be used are aliphatic hydrocarbons such as pentane, hexane and heptane and aromatic hydrocarbons such as toluene, xylene and benzene.

If a diluent is used, usually the resin composition mixture contains from about 5 to about 60 weight percent and more often contains from about 10 to about 50 weight percent of the resin therein.

The various resin polymerizates and resins, such as those derived from unsaturated hydrocarbons in petroleum fractions and processes related thereto, and those derived from terpenes can be treated by the method of this invention. For example, the terpene resins prepared by polymerizing terpenes such as alpha pinene, beta pinene, dipentene, limonene, alpha-terpinene, myrocene, allo-ocimene, and ocimene and other terpenes of the general formula $C_{10}H_{16}$ can be treated.

When preparing resins of unsaturated hydrocarbons such as those obtained from petroleum fractions and processes relating thereto, it is usually desired to copolymerize at least one unsaturated hydrocarbon having one double bond (monoolefin) with at least one unsaturated hydrocarbon having more than one double bond (diolefin). Representative of various diolefins are diolefins having from 4 to 8 and preferably from 4 to 6 carbon atoms, particularly the conjugated dienes such as 1,3-butadiene, 2-methyl-1,3-butadiene (isoprene), 2-ethyl-1,3-butadiene and 1,3-pentadiene (piperylene). It is usually preferred that at least one of the double bonds is alpha to the first carbon atom. Representative of various monoolefins are aliphatic monoolefins having from 3 to 8, and preferably from 4 to 6, carbon atoms such as propylene, the various butenes, including 2-methyl-2-butene, the pentenes, the hexenes, the heptenes and the octenes.

The resins and polymerizates are generally prepared by polymerizing the monomers in an inert volatile solvent or diluent in the presence of a suitable catalyst such as a Friedel-Crafts type catalyst, preferably selected from aluminum chloride, aluminum bromide, stannic chloride, boron trifluoride and boron trifluoride etherate. Usually, for convenience, particulate anhydrous aluminum chloride is preferred.

The resins are typically composed of long chain polymers having various molecular weights, and normally a relatively minor portion of lower molecular weight polymers. The resins typically have softening points ranging from about 80° C. or lower to about 150° C. and sometimes up to about 200° C., according to ASTM test method E-28-58T, and higher. For many commercial applications their softening points are effectively increased by removing at least a part of the lower molecular weight polymers from the resin.

In the preparation of the resins, a wide range of temperatures are suitable for the Friedel-Crafts polymerizations. For example, the polymerizations can normally be carried out in the range of from about −20° C. to about 100° C. and usually more preferably from about 0° C. to about 50° C. but above the freezing point of the reaction system and below its boiling point. Certainly, the pressure at which the reaction is being conducted should be taken into consideration when determining the optimum temperature. The polymerization reaction pressures may be atmospheric or above or below atmospheric pressure. Generally a satisfactory polymerization is conducted at about autogenous pressure developed under the operating conditions used. Typically, the time of the reaction can vary from a few seconds to 12 hours or more, depending somewhat upon the reactants, the catalysts and the temperatures used.

Exemplary of a resin composition prepared by polymerizing an unsaturated hydrocarbon mixture comprising a monoolefin and a diolefin is the polymerization of a mixture comprising 2-methyl-2-butene and 1,3-pentadiene in the presence of a Friedel-Crafts catalyst described in U.S. patent application No. 556,293, filed June 9, 1966. Such a resin polymer can be prepared, for example, by polymerizing a mixture comprising from about 20 to about 75 weight percent of piperylene and from about 80 to about 25 weight percent of 2-methyl-2-butene in the presence of an anhydrous catalyst selected from aluminum chloride, aluminum bromide, stannic chloride, boron trifluoride and boron trifluoride etherate at a temperature of from about 0° C. to about 50° C. It is usually preferred to conduct the polymerization in an inert volatile organic solvent using aluminum chloride having a mesh size of from about 5 to about 200 U.S. Sieve size as the catalyst.

The following examples further illustrate the invention and are not intended to be limiting. In these examples the parts and percentages are by weight unless otherwise indicated.

EXAMPLE I

A hydrocarbon resin polymerizate was prepared by the following method:

In a suitable reactor was placed 50 parts of heptane and 3.08 parts of anhydrous aluminum chloride. The mixture was cooled to about 5° C. While continuously stirring the mixture, 200 parts of a hydrocarbon mixture was slowly added to the reactor over a period of 30 minutes. The hydrocarbon mixture had the following composition:

| Component: | Percent |
|---|---|
| 2-pentene | 4.8 |
| 2-methyl-2-butene | 42.2 |
| Isoprene | 2.5 |
| 1,3-pentadiene (piperylene) | 42.4 |
| 2,3-dimethyl-1-butene | 2.6 |
| Unsaturated hydrocarbons containing 5 to 6 carbon atoms | 5.5 |

The temperature of the reaction was maintained in a range of about 5° C. to 10° C. The catalyst was deactivated with a stoichiometric amount of water, lime and clay. The clay was added as a filter aid. The mixture was then filtered to remove particles of the decomposed aluminum chloride, lime and clay. A resin prepared by the method of this example had a pale yellow color, a disagreeable odor when slightly heated, and a softening point, according to ASTM Method E28–58T, of about 94° C.

The polymerizate comprised about 40 weight percent of the resin and correspondingly about 60 weight percent of unreacted monomer, light hydrocarbons and heptane.

EXAMPLE II

A resin refining system comprising a thermosyphon reboiler driven by steam distillation was constructed according to the schematic drawing of FIG. 1. A jacketed 50-gallon reactor was used as the separating zone, or separator. A vertical multiple straight stainless steel tube single pass steel shell was used as the reboiling zone, or reboiler. The reboiler had 14 tubes with diameters of about 0.75 inch, each about 3 feet long, representing a total of about 8 square feet of heat transfer surface, heated by Dowtherm (Dowtherm is a registered trademark of The Dow Chemical Company for a liquid heat transfer oil). In the lower part of the reboiler below the vertical tubes was fitted a perforated plate for the introduction of steam. A condenser was attached to the 50-gallon separator.

Into the 50-gallon separator was introduced 192 pounds of the type of resin polymerizate prepared according to the method of Example I from which the catalyst residue had been removed. The polymerizate contained about 40-weight percent resin having a softening point of about 94° C. and correspondingly about 60-weight percent of un-reacted monomer, light hydrocarbons, and heptane. The polymerizate was gravity fed to the lower portion of the reboiler. Heated Dowtherm was applied to the jacket of the reboiler and a light distillate comprising unreacted monomers, light hydrocarbons and heptane boiled out overhead into the vapor portion of the separator, withdrawn therefrom, and condensed in the condenser. As the light distillate boiled out of the reboiler, 391 additional pounds of the polymerizate was pumped into the separator at an average rate of about 164 pounds per hour and gravity fed to the reboiler.

The steam was then introduced at about 107° C. through the perforated plate at the rate of 36 pounds per hour. The steam introduction with the Dowtherm heated jacket provided a temperature in the lower part of the reboiler of about 125° C. The resin became entrained and recycled overhead back to the separating zone followed by gravity flow, because of a positive pressure differential, back into the reboiler. It seemed to be pumped overhead from the reboiler to the separator. Lower molecular weight polymers, seemingly in the nature of oils, vaporized and were withdrawn from the separator and condensed. After about 20 minutes of recycling, the temperature in the lower portion of the stripping zone was about 135° C. The steam rate was then increased to 45 pounds per hour and a vacuum applied. After about 1.75 more hours the steam rate was increased to 65 pounds per hour for 3.25 additional hours. At the end of the treatment (5 hours and 20 minutes), the temperature in the lower portion of the stripping zone was 200° C. at a reduced pressure of 100 mm. of mercury absolute. The steam temperature at that time was 77° C. and the Dowtherm temperature was 230° C. The resin was discharged, showing a yield of 267.5 pounds and a softening point of 103.5° C. according to ASTM Test Method E28–58T and little or no disagreeable odor at room temperature or when slightly heated.

EXAMPLE III

A resin refining system was provided according to Example II comprising the thermosyphon reboiler driven by steam distillation. A resin polymerizate of the type prepared according to the method of Example I from which the catalyst residue had been removed was refined according to Example II except that no vacuum was applied and that the refining step was started with the reboiler empty and heated to 260° C. with Dowtherm. The polymerizate contained about 40 weight percent of resin having a softening point of about 94° C. and correspondingly about 60 weight percent of unreacted monomer, light hydrocarbons and heptane.

In particular, after heating the reboiler to about 260° C. with the Dowtherm, 747 pounds of the polymerizate was fed to the lower part of the reboiler at an average rate of about 233 pounds per hour. A light distillate flashed from the polymerizate which comprised generally the unreacted monomers, light hydrocarbons and heptane. After all the polymerizate had been fed into the reboiler, steam was introduced through the perforated plate at a rate of about 52 pounds per hour and a temperature of about 107° C. The resin was entrained and recycled as in Example II. After about 4½ hours the temperature of the composition in the reboiler was about 220° C. and the resin withdrawn therefrom had a softening point of 100.4° C. An hour later the resin withdrawn therefrom had a softening point of 101.4° C. and little, if any, disagreeable odor at room temperature or when slightly heated.

The various resins are useful for many purposes such as extenders, fillers and tackifiers in many applications, such as in natural and synthetic rubbery polymers. Usually the higher their softening points the more commercially desirable they become. Low disagreeable odor contents are also desirable. Therefore, the method of this invention of refining resins and resin polymerizates has special advantageous utility in increasing their softening points.

While certain representative embodiments and details have been shown for the purpose of illustrating the invention, it will be apparent to those skilled in this art that various changes and modifications may be made therein without departing from the spirit or scope of the invention.

What is claimed is:

1. A method of purifying a resin composition containing lower molecular weight polymers which comprises obtaining the resin composition in a liquid phase in a resin refining system comprising a thermosyphon reboiler driven by steam distillation, where the seam is introduced at a sufficient rate to entrain at least a part of the resin and where at least a part of the lower molecular weight polymer is withdrawn with the steam from the refining system.

2. The method according to claim 1 of refining a resin composition comprising a resin containing lower molecular weight polymers which method comprises
   (a) obtaining the composition in a liquid phase in a resin refining system comprising a separating zone and a steam reboiling zone, where the separating zone has an upper vapor portion and a lower liquid portion containing an enriched liquid resin composition, and in the refining system,
   (b) discharging the liquid composition in a liquid enriched resin state from the liquid portion of the said separating zone into the said steam reboiling zone,
   (c) passing steam to the lower portion of the steam reboiling zone and into the said enriched liquid resin composition therein at a sufficient rate to entrain at least a portion of the liquid resin,
   (d) recycling at least a part of the lower molecular weight polymers from the upper portion of the steam reboiling zone to the vapor portion of the separating zone,
   (e) withdrawing the steam and at least a part of the lower molecular weight polymers from the vapor portion of the separating zone to enrich the resin composition, condensing the remainder of the lower molecular weight polymers into the liquid portion of the separating zone, and
   (f) maintaining a sufficient amount of liquid enriched resin composition in the liquid portion of the separating zone to provide a positive pressure differential between the separating zone and the steam reboiling zone.

3. The method of claim 2 wherein steam is passed into the reboiling zone at a sufficient rate to recycle the entrained liquid resin from the reboiling zone to the vapor portion of the separating zone and depositing the said resin in the liquid portion of the separating zone.

4. The method of claim 3 wherein the resin composition is refined under a reduced pressure and the liquid composition is recycled from the separating zone to the reboiling zone essentially by simple gravity flow.

5. The method according to claim 3 wherein the said resin composition is a resin polymerizate comprising a resin containing lower molecular weight polymers, unreacted monomers and volatile organic solvent.

6. The method of claim 5 where the resin composition is prepared by the polymerization of unsaturated hydrocarbons in a volatile organic solvent in the presence of a Friedel-Crafts type catalyst.

7. The method of claim 3 wherein the resin composition is prepared by polymerizing in a volatile organic solvent and in the presence of an anhydrous catalyst compounds selected from terpenes and from mixtures comprising at least one monoolefin having from 3 to 8 carbon atoms and at least one diolefin having from 4 to 8 carbon atoms, and where the anhydrous catalyst is selected from aluminum chloride, aluminum bromide, stannic chloride, boron trifluoride and boron trifluoride etherate.

8. The method according to claim 7 where the resin composition is refined under a reduced pressure.

9. The method according to claim 8 where the steam is super-heated, the reboiler is a vertical, multiple straight tube single pass shelled reboiler having a heated jacket thereon and where the liquid composition is recycled from the separating zone to the reboiling zone essentially by simple gravity flow.

10. The method according to claim 9 where the resin composition has a softening point of from about 80 to about 100° C. and is prepared by polymerizing at a temperature of from about 0° C. to about 50° C. a mixture comprising from about 20 to about 75 weight percent of piperylene and from about 80 to about 25 weight percent of 2-methyl-2-butene and where the said solvent is selected from aliphatic hydrocarbons and aromatic hydrocarbons.

References Cited

UNITED STATES PATENTS

| | | | |
|---|---|---|---|
| 2,974,131 | 3/1961 | McLeod | 260—94.9 |
| 3,202,647 | 8/1965 | Todd et al. | 260—94.7 |
| 3,241,600 | 3/1966 | Whitehouse | 159—48 |

JOSEPH L. SCHOFER, Primary Examiner

J. C. HAIGHT, Assistant Examiner

U.S. Cl. X.R.

260—82, 82.1, 88.2, 93.3, 96